(12) United States Patent
Shaikh et al.

(10) Patent No.: US 8,769,935 B2
(45) Date of Patent: Jul. 8, 2014

(54) SYSTEM AND METHOD FOR MONITORING REDUCTANT QUALITY

(75) Inventors: Furqan Zafar Shaikh, Troy, MI (US); John Paul Bogema, Flat Rock, MI (US); Michiel J. Van Nieuwstadt, Ann Arbor, MI (US); Scott Donald Cooper, Ann Arbor, MI (US); Garry Anthony Zawacki, Livonia, MI (US); Jacobus Hendrik Visser, Farmington Hills, MI (US); William Charles Ruona, Farmington Hills, MI (US); Timothy Webb, Ann Arbor, MI (US); Ed Kulik, Plymouth, MI (US); David K. Chen, Rochester Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 110 days.

(21) Appl. No.: 13/429,125

(22) Filed: Mar. 23, 2012

(65) Prior Publication Data

US 2012/0192548 A1  Aug. 2, 2012

Related U.S. Application Data

(63) Continuation of application No. 11/669,739, filed on Jan. 31, 2007, now Pat. No. 8,141,346.

(51) Int. Cl.
*F01N 3/00* (2006.01)
*F01N 3/10* (2006.01)

(52) U.S. Cl.
USPC .......... 60/286; 60/274; 60/295; 60/301; 60/303

(58) Field of Classification Search
USPC .......... 60/274, 286, 295, 301, 303
See application file for complete search history.

(56) References Cited

U.S. PATENT DOCUMENTS

| | | | |
|---|---|---|---|
| 6,063,350 A | 5/2000 | Tarabulski et al. |
| 6,532,736 B2 | 3/2003 | Hammerle et al. |
| 7,067,319 B2 | 6/2006 | Wills et al. |
| 7,610,750 B2 | 11/2009 | Viola et al. |
| 7,707,826 B2 | 5/2010 | Wang et al. |
| 2005/0207936 A1 | 9/2005 | Berryhill et al. |

FOREIGN PATENT DOCUMENTS

EP  1669743 A1  6/2006

*Primary Examiner* — Thomas Denion
*Assistant Examiner* — Diem Tran
(74) *Attorney, Agent, or Firm* — Julia Voutyras; Alleman Hall McCoy Russell & Tuttle LLP

(57) ABSTRACT

A method of operating an internal combustion engine having a reductant delivery and storage system in an emission control system, comprising of correlating a change in a monitored operating condition with a refill event to determine whether a reductant-diluting substance has been added to the reductant storage system; and limiting vehicle operation based on the correlation.

14 Claims, 4 Drawing Sheets

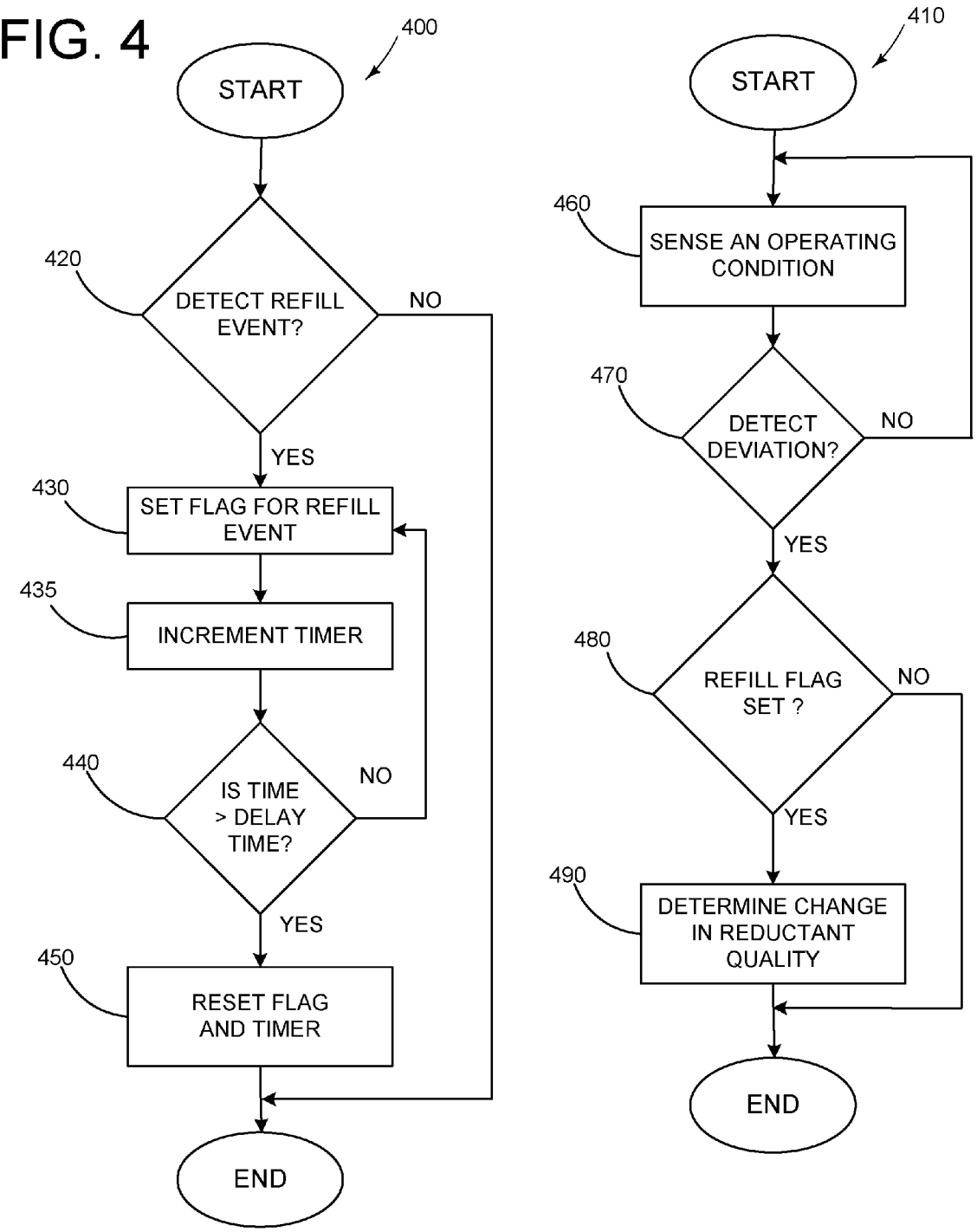

SYSTEM AND METHOD FOR MONITORING REDUCTANT QUALITY

CROSS REFERENCE TO RELATED APPLICATIONS

The present application is a continuation of U.S. patent application Ser. No. 11/669,739 filed Jan. 31, 2007, the entire contents of which are incorporated herein by reference for all purposes.

TECHNICAL FIELD

The present application relates to the field of automotive emission control systems and methods.

BACKGROUND AND SUMMARY

Selective catalytic reduction (SCR) systems have been used to reduce automotive emissions. However, SCR systems may use a reductant, such as urea, stored in an on-board storage device that may be subject to tampering. For example, a vehicle operator may introduce an ineffective fluid to a reductant storage device.

One way to detect operator tampering attaches a urea concentration sensor to a reductant storage device opening to detect the introduction of a non-urea solution (or reduced-urea solution) fluid. However, urea concentration sensors may increase vehicle cost, and may lead to still further diagnostic issues. Further, the availability of urea concentration sensors may be limited.

The inventors herein have realized that a logic driven method may be implemented using existing system infrastructure to monitor reductant quality of an emission control system by determining a pre-refill operating condition of the emission control system, detecting a refill event of a reductant storage device, after said refill event, determining a post-refill operating condition of the emission control system, comparing said post-refill operating condition to said pre-refill operating condition of the emission control system, and detecting a reduction in reductant quality based on at least said pre-refill and post-refill operating conditions. In another approach, a change of a monitored operating condition can be correlated with a re-fill event to determine whether to indicate a potential for urea storage modification, and/or whether to modify engine or vehicle operating conditions. Such methods of monitoring reductant quality may facilitate the detection of undesirable fluids entry into an emission control system without the installation of additional hardware, or in addition to such hardware.

BRIEF DESCRIPTION OF THE DRAWINGS

FIG. 4 is a flowchart of another exemplary method for monitoring a reductant quality in an emission control system.

DETAILED DESCRIPTION OF THE DEPICTED EMBODIMENTS

Figure 1:
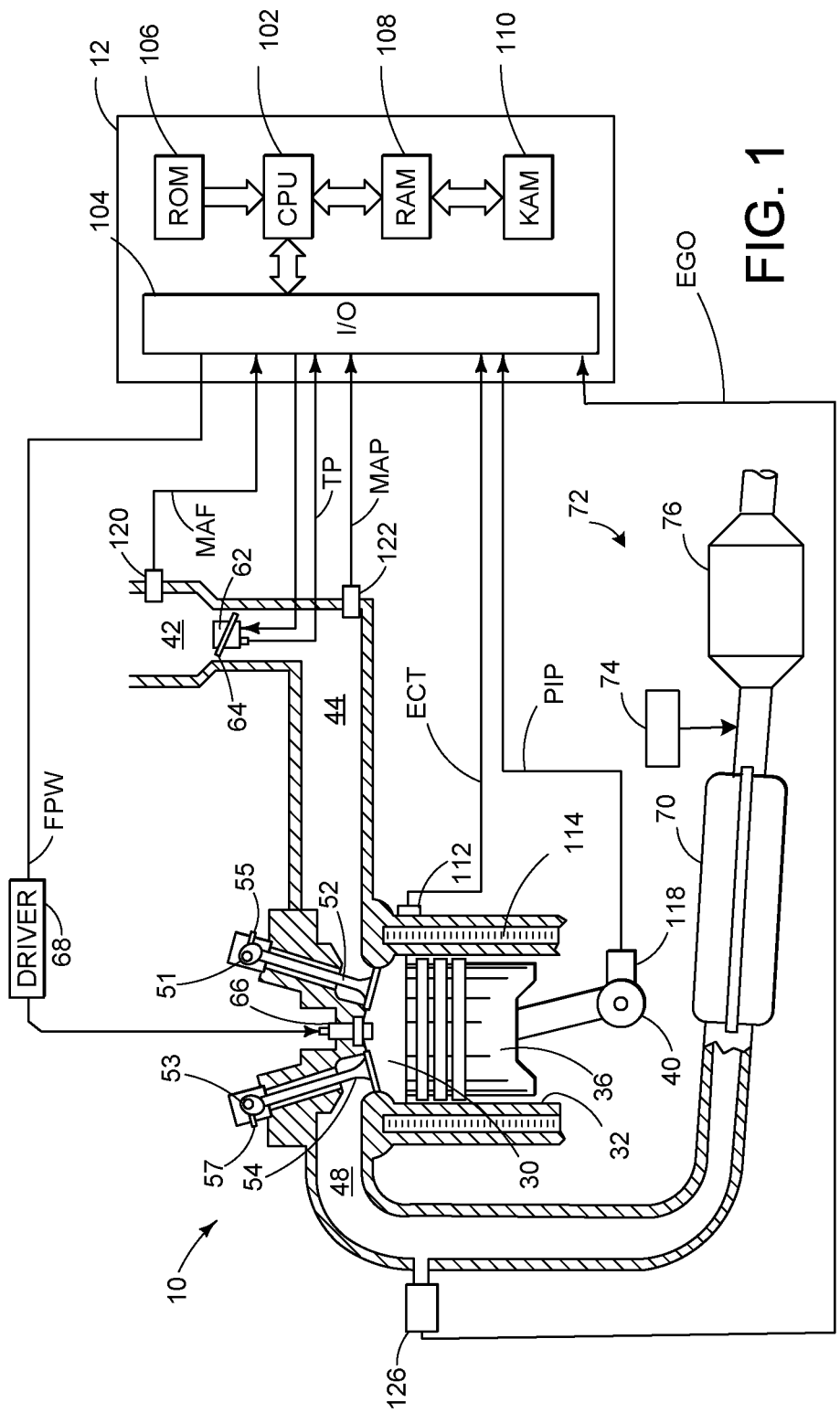
FIG. 1 shows an exemplary embodiment of an internal combustion engine and control system.

Referring now to FIG. 1, direct injection internal combustion engine 10, comprising a plurality of combustion chambers and controlled by electronic engine controller 12, is shown. Combustion chamber 30 of engine 10 includes combustion chamber walls 32 with piston 36 positioned therein and connected to crankshaft 40. In one example, piston 36 includes a recess or bowl (not shown) to form selected levels of stratification or homogenization of charges of air and fuel. Alternatively, a flat piston may also be used.

Combustion chamber 30 is shown communicating with intake manifold 44 and exhaust manifold 48 via intake valve 52, and exhaust valve 54. Fuel injector 66 is shown directly coupled to combustion chamber 30 for delivering liquid fuel directly therein in proportion to the pulse width of signal fpw received from controller 12 via conventional electronic driver 68. Fuel is delivered to fuel system (not shown) including a fuel tank, fuel pumps, and a fuel rail. In some embodiments, engine 10 may include a plurality of combustion chambers each having a plurality of intake and/or exhaust valves.

Intake valve 52 may be controlled by controller 12 via electric valve actuator (EVA) 51. Similarly, exhaust valve 54 may be controlled by controller 12 via EVA 53. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, combustion chamber 30 may alternatively include an intake valve controlled via electric valve actuation and an exhaust valve controlled via cam actuation including CPS and/or VCT.

Intake manifold 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake manifold 42 may include a mass air flow sensor 120 and a manifold air pressure sensor 122 for providing respective signals MAF and MAP to controller 12.

Controller 12 activates fuel injector 66 so that a desired air-fuel ratio mixture is formed. Controller 12 controls the amount of fuel delivered by fuel injector 66 so that the air-fuel ratio mixture in chamber 30 can be selected to be substantially at (or near) stoichiometry, a value rich of stoichiometry, or a value lean of stoichiometry. Further, controller 12 is configured to activate fuel injector 66 so that multiple fuel injections may be performed during a cycle.

Exhaust manifold gas sensor 126 is shown coupled to exhaust passage 48 upstream of catalytic converter 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor.

Catalytic converter 70 is shown in communication with exhaust manifold 48. In some embodiments, catalytic converter 70 may be a diesel oxidation catalyst. An emission control system 72 is shown downstream catalytic converter 70. Emission control system 72 may include reductant storage device 74 and emission control device 76. Emission control device 76 is shown in communication with catalytic converter 70. Further, reductant storage device 74 may supply a reductant to an exhaust stream entering emission control device 76. Emission control system 72 is described in more detail in FIG. 2. Controller 12 is configured to control emission control system 72. This feature is described in more detail below.

Controller 12 is shown in FIG. 1 as a conventional microcomputer including: microprocessor unit 102, input/output ports 104, an electronic storage medium of executing programs and calibration values, shown as read-only memory chip 106 in this particular example, random access memory 108, keep alive memory 110, and a conventional data bus.

Controller 12 is shown receiving various signals from sensors coupled to engine 10, in addition to those signals previously discussed, including: engine coolant temperature (ECT) from temperature sensor 112 coupled to cooling sleeve 114; a profile ignition pickup signal (PIP) from Hall effect sensor 118 coupled to crankshaft 40 giving an indication of engine speed (RPM); throttle position TP from throttle position sensor 120; and absolute Manifold Pressure Signal MAP from sensor 122. Engine speed signal RPM is generated by controller 12 from signal PIP in a conventional manner and manifold pressure signal MAP provides an indication of engine load.

Combustion in engine 10 can be of various types, depending on operating conditions. While FIG. 1 depicts a compression ignition engine, it will be appreciated that the embodiments described below may be used in any suitable engine, including but not limited to, diesel and gasoline compression ignition engines, spark ignition engines, direct or port injection engines, etc. Further, various fuels and/or fuel mixtures such as gasoline, diesel, H2, ethanol, methane, and/or combinations thereof may be used.

Figure 2:
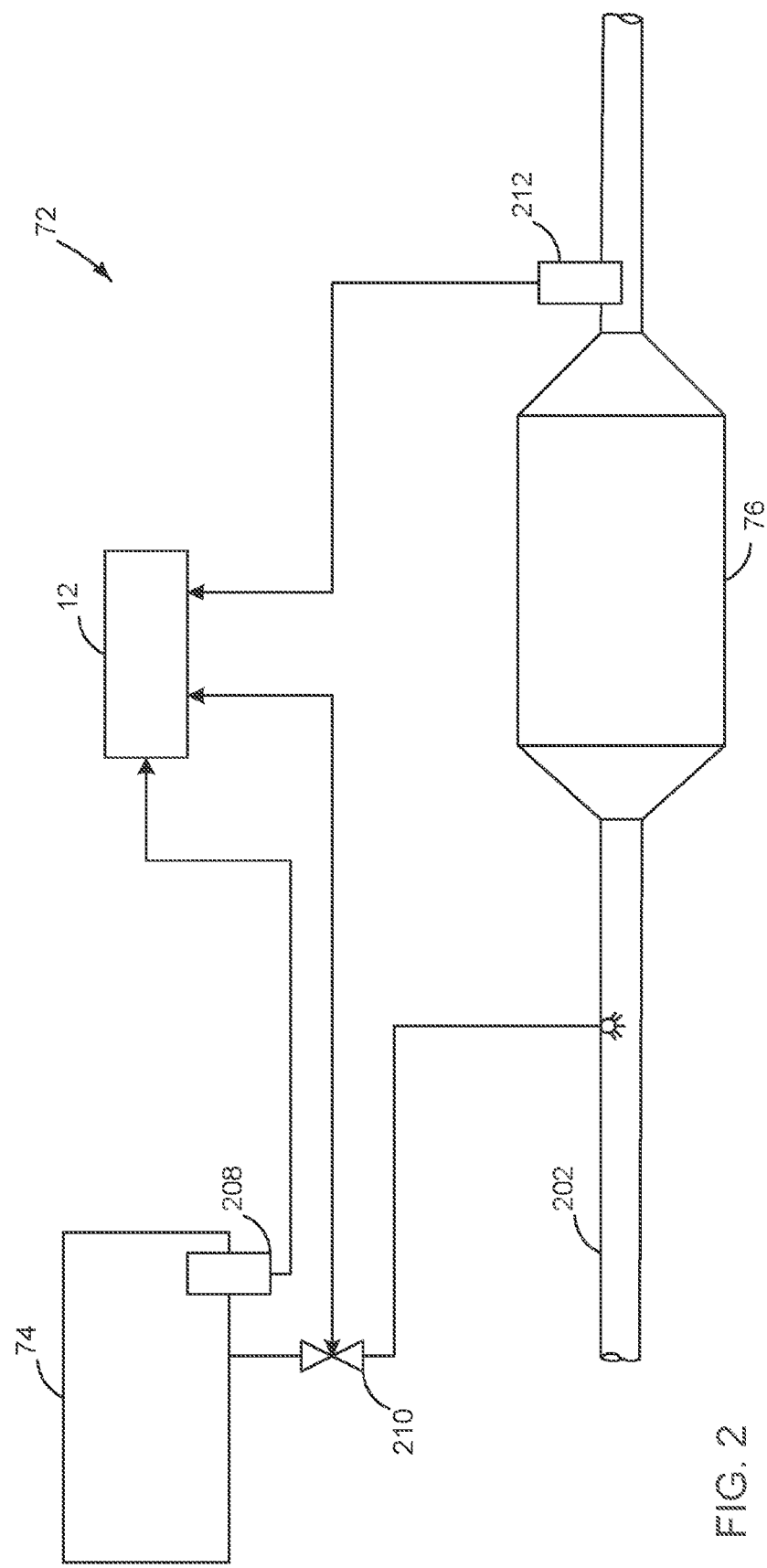
FIG. 2 shows an exemplary embodiment of an emission control system.

FIG. 2 shows an example of emissions control system 72 of engine 10 in more detail. Generally, the components described herein may operate to monitor a quality of a liquid stored in reductant storage device 74. In particular, various operating conditions of the emission control system may be monitored by various components to sense changes in the quality of a liquid supplied to emission control device 76 from reductant storage device 74. As described in FIG. 1, emission control system 72 may include reductant storage device 74 configured to supply a reductant to emission control device 76. Further, emission control system 72 may include controller 12 configured to process information within the emission control system from various components. In the embodiments described herein, the emission control system may further include fill or level sensor 208, reductant valve 210, and NOx sensor 212.

Reductant storage device 74 may be an on-board storage device for storing a fluid used in emission control device 76. Further, the reductant storage device may include a level sensor 208. In some embodiments, the reductant storage device may store a reductant, such as a urea solution. Under some conditions, a fluid may be introduced to the reductant storage device to replace reductant used in the emission control device, for example. As such, the level sensor may detect a refill event. For example, a level sensor may change states in response to an amount of fluid introduced to the reductant storage device. Other approaches for identifying a refill event may be used in place of, or in addition to, monitoring the reductant level. For example, a reductant opening sensor may be used to identify when the reductant storage device is opened to be checked/refilled. Further, a reductant storage device pressure sensor may be used. Under other conditions, the reductant storage device may supply a reductant, such as a urea solution, to the exhaust system upstream emission control device 76. In some embodiments, the emission control system may include a reductant valve 210 fluidically disposed along a conduit coupling the reductant storage device to the exhaust system. In particular, the controller may prompt the reductant valve to release an amount of reductant from the reductant storage device so as to substantially reduce NOx entering emission control device 76. As such, reductant from the reductant storage device may be absorbed in emission control device 76 to reduce NOx in the exhaust stream.

Emission control device 76 may facilitate the reduction of NOx in the exhaust from engine 10 by a reductant stored in the reductant storage device. In particular, the emission control device may be an SCR catalyst. In some embodiments, a urea solution may be supplied to the SCR catalyst. As such, NOx from the exhaust system reacting with urea in the SCR catalyst may form more environmentally benign products such as nitrogen, carbon dioxide, and water for emission into the atmosphere. Some exemplary SCR reactions are as follows.

First, urea added to the exhaust system may decompose into ammonia as follows:

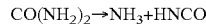

$CO(NH_2)_2 \rightarrow NH_3 + HNCO$

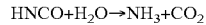

$HNCO + H_2O \rightarrow NH_3 + CO_2$

Ammonia may, in turn, react with NOx in the SCR catalyst according to various different reaction pathways, including but not limited to one or more of the following:

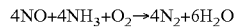

$4NO + 4NH_3 + O_2 \rightarrow 4N_2 + 6H_2O$

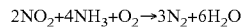

$2NO_2 + 4NH_3 + O_2 \rightarrow 3N_2 + 6H_2O$

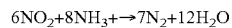

$6NO_2 + 8NH_3 + \rightarrow 7N_2 + 12H_2O$

$NO + NO_2 + 2NH_3 \rightarrow 2N_2 + 3H_2O$

It may be desirable to introduce an amount of urea to the exhaust system generally derived from the above NOx reduction reaction stoichiometries or a look-up table stored in the controller. In particular, the amount of urea introduced to the exhaust system may be based on information from a sensor. For example, the output signal from a sensor, such as exhaust gas manifold sensor 126 shown in FIG. 1, may indicate an amount of NOx in the exhaust. As such, the controller may prompt the reductant valve to introduce an amount of urea to the exhaust system accordingly where the amount of urea injected may be expected to substantially consume the urea and convert a substantial portion of the NOx. Further, the controller may monitor various species (i.e. urea, ammonia, NOx, etc) entering and/or leaving the SCR catalyst to determine a conversion efficiency of the emission control system.

The controller may monitor performance of the emission control system such that substantially low performance levels may be indicated. In particular, a performance may be determined based on various operating conditions. Specifically, the controller may communicate with various components of the emission control system to monitor performance of the emission control system. While the emission control system described herein may include reductant valve 210 and NOx sensor 212, various other components or combinations thereof may also be used. For example, an ammonia sensor may be included. Further, although NOx sensor 212 as shown in FIG. 2 may be disposed downstream the SCR catalyst, the NOx sensor and/or various other sensors may be disposed at various other locations within the system. As shown by the embodiment of FIG. 2, reductant valve 210, NOx sensor 212, and/or exhaust manifold gas sensor 126 (shown in FIG. 1), may be used to monitor various concentrations and/or amounts of species, such as urea or NOx, for example, in the emission control system. By doing this, the controller may monitor performance of the emission control system based on various operating conditions as sensed by various components as described herein.

In some embodiments, an operating condition may be a conversion efficiency of the emission control system. Further, conversion efficiency of the emission control system may be determined based on a concentration of NOx leaving the SCR catalyst and/or a flow rate of reductant introduced to the exhaust system, although conversion efficiency may also be based on exhaust gas manifold sensor 126, an ammonia sensor (not shown), various other components, or some combination thereof. For example, a concentration of NOx detected in the exhaust may be used to determine a conversion efficiency of the emission control system. Alternately or in addition, a flow rate of reductant introduced to the exhaust system may be used to determine a concentration of ammonia and/or urea entering the SCR catalyst. As such, the NOx sensor and/or the reductant valve may be used to determine a conversion efficiency of the emission control system.

It may be desirable to determine various operating conditions where the operating conditions may indicate performance of the emission control system. In some embodiments, performance may be based on an operating condition such as conversion efficiency derived from the above NOx reduction reaction stoichiometries or a look-up table stored in the controller. As such, a conversion efficiency limitation or a deviation from a target conversion efficiency may be determined so as to indicate degraded performance as necessary. For example, conversion efficiency of less than a predetermined conversion efficiency (e.g. 60% conversion, etc.) may trigger a signal to the controller indicating degraded performance. Alternately, a deviation from a target performance may be used. In one example, a predetermined deviation (e.g. a 50% reduction in conversion efficiency, etc.) from a predetermined target performance may indicate degraded performance. In another variation, a predetermined target performance may be based on a conversion efficiency under control or steady-state conditions. In some embodiments, degraded performance of the emission control system may be indicated based directly on operating conditions sensed from one or more components. For example, a NOx concentration leaving the SCR catalyst may be greater than a predetermined threshold NOx concentration where the predetermined threshold concentration may be substantially large such that determining a conversion efficiency may not be necessary. Alternately, a change in NOx concentration during a predetermined range of time may indicate degraded performance, such as if a NOx concentration increased such that NOx may not be reduced in the SCR catalyst. In another variation, a change in reductant flow rate during a predetermined range of time may prompt an output signal to the controller to indicate degraded performance. For example, a volumetric flow rate of reductant may suddenly double or triple.

Degraded performance in the emission control system may prompt the controller to determine a cause of the degraded performance. Under some conditions, degraded performance of the emission control system may indicate a change in reductant quality. In particular, the controller may detect a more rapid change of one or more operating conditions in response to a refill event, as compared to other events or previous refill events. As such, various longer term (or slower) degradation effects (e.g. drops in performance as a result of catalyst aging, evaporation of the reductant, etc.) may not be a cause of a more sudden change of performance. Specifically, more rapid changes of one or more operating conditions of the emission control system may indicate a condition where a reductant may be replaced by an in-effective fluid. For example, a vehicle operator may introduce a reductant-diluting substance to the reductant storage tank during a refill event where the reductant-diluting substance may be water, gasoline, a reductant of reduced reductant quality, etc. As such, it may be desirable to monitor the reductant storage device (i.e. with a level sensor, etc.) so as to detect a refill event. In doing this, the controller may be able to compare an operating condition before a refill event to an operating condition after a refill event so as to detect a change in performance in response to a refill event. Further, it may be desirable to determine a range of time wherein, if a change in performance and a refill event may be detected, it may be understood that a change in performance may be in response to a refill event. As such, a drop in performance subsequent to a refill event may indicate a condition where an ineffective fluid, or partially ineffective fluid, may be introduced to the reductant storage tank (i.e. instead of a reductant, such as urea solution, for example).

It will further be appreciated that the specific embodiments described herein are merely exemplary, and that other embodiments may include only subsets of the structures described, and/or or any suitable additional structures not shown.

Figure 3:
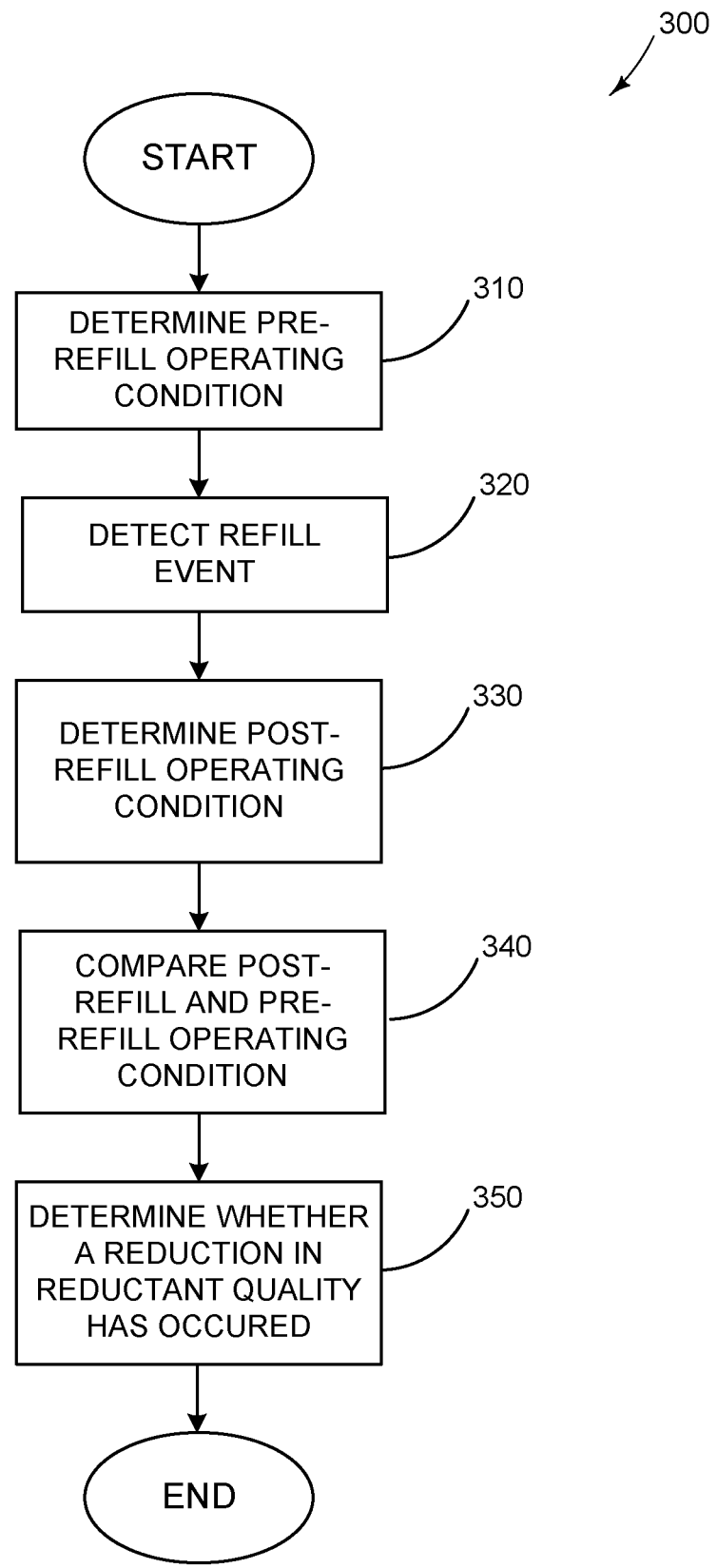
FIG. 3 is a flowchart of an exemplary method for monitoring a reductant quality in an emission control system.

FIG. 3 is a flowchart of an embodiment of a method for monitoring reductant quality. Generally, method 300 may describe determining a reduction in reductant quality based on comparing an operating condition prior to a refill event and subsequent to the refill event.

At step 310, an operating condition may be determined in the emission control system. In some embodiments, an operating condition may be a conversions efficiency of the emission control system. In addition to or alternately, an operating condition may be a NOx concentration and/or a flow rate from a reductant storage tank, as described above. Further, an operating condition may be a predetermined operating condition or a steady-state operating condition, for example.

Next, at step 320, a refill event may be detected. In some embodiments, level sensor 208 mounted to the reductant storage tank may be used to detect a refill event. For example, the level sensor may change states in response to an amount of fluid introduced to the reductant storage device. As such, the level sensor may send an output signal to the controller indicating a refill event. Under some conditions, a reductant, such as a urea solution, may be introduced to the reductant storage device thereby triggering a refill event. However, under other conditions, the level sensor may change states in response to various other conditions. For example, an inclination of the vehicle, such as on a hill, may trigger an output signal indicating a refill event. In another example, road conditions may cause the level sensor to indicate a refill event in response to turbulence of the reductant storage device whereby a fluid may splash on the level sensor. In yet another example, freezing conditions may result in expansion of a fluid contained in the reductant storage tank resulting in a level change in the reductant storage tank. As such, the controller may prompt an algorithm, for example, such that method 300 may detect a refill event as a result of an amount of fluid introduced to the reductant storage device, not an inclination of the vehicle or turbulence of the reductant storage device, for example. In one example, the routine may identify a refill based on a combination of factors, including reductant level, inclination, road conditions, ambient temperature, etc.

Further, under even other conditions, a fluid may be introduced to the reductant storage device where the quality of the fluid may vary substantially from a reductant, such as urea solution. For example, water may be introduced to the reductant storage device during a refill event where a reductant quality of water may be substantially less than a reductant quality of a reductant, such as urea solution, stored in the reductant storage device prior to the refill event. As such, the controller may be prompted to introduce an amount of a fluid of reduced reductant quality, such as water, to the exhaust system to substantially reduce NOx.

At step 330, an operating condition may be determined in the emission control system. In particular, a post-refill operating condition may be determined where the post-refill operating condition may be the same operating condition as the pre-refill operating condition determined in step 310. In some embodiments, a pre-refill operating condition may be a pre-refill conversion efficiency of the emission control system. As such, a post-refill conversion efficiency may be determined after the refill event. In other embodiments, a pre-fill operating condition may be a NOx concentration leaving the SCR catalyst before a refill event, and a post-refill operating condition may be a NOx concentration after the refill event. Further, in yet other embodiments, a pre-fill operating condition may be a reductant flow rate before a refill event, and a post-refill operating condition may be a reductant flow rate after the refill event. However, the pre-refill and post-refill operating conditions may be one or more of the operating conditions described herein.

At step 340, a post-refill operating condition may be compared to a pre-refill operating condition. Under some conditions, such as following a refill event where a reductant may be introduced to the reductant storage tank, a post-refill operating condition (i.e. conversion efficiency, NOx concentration, reductant flow rate, etc.) may be substantially the same as a pre-refill operating efficiency. As such, the controller may indicate acceptable performance of the emission control system. However, under other conditions, such as following a refill event where water may be introduced to the reductant storage device, a post-refill operating condition may vary substantially from a pre-refill operating condition whereby a comparison of a post-refill operating condition and a pre-refill operating condition may indicate a reduction in reductant quality. In some embodiments, a post-refill conversion efficiency may be substantially lower than a pre-refill conversion efficiency. Alternately or in addition, a post-refill NOx concentration may be substantially higher than a pre-refill NOx concentration. Further, a post-refill reductant flow rate may be substantially greater than a pre-refill reductant flow rate. In this way, one or more of the operating conditions described herein may be used to determine a drop in performance after a refill event.

At step 350, the controller may determine a reduction in reductant quality based on a comparison between a post-refill operating condition and a pre-refill operating condition as described in step 340. As such, it may be desirable to perform various subsequent steps to address the reduced reductant quality. In some embodiments, the controller may send a signal so as to indicate a degraded quality reductant. For example, an indicator on a vehicle dashboard may alert a vehicle operator of a reduction in reductant quality whereby the operator may be prompted to limit vehicle operation. In another example, the controller may facilitate a limitation on operating the engine after a reduction in reductant quality may be determined. For example, the engine may be permitted to operate for a number of miles, engine restarts, tank refills, various other increments, or some combination thereof until an acceptable reductant quality may be detected. In some embodiments, the controller may enable various other emission control strategies until an acceptable reductant quality may be detected. For example, the controller may control engine operation so as to abate NOx via various other mechanisms, such as exhaust gas recirculation, engine timing, derating, etc.

FIG. 4 is a schematic of flowcharts for another embodiment of a method for monitoring reductant quality. Generally, the flowcharts may describe detecting a deviation in performance of the emission control system and determining whether the deviation may be in response to a change in reductant quality based on a state of a refill flag. In particular, method 400 may include a refill event flowchart 400 and a monitoring flow chart 410.

Referring specifically to refill event flowchart 400, the flowchart begins at step 420 by determining whether a refill event may be detected. As described herein, a level sensor 208 may be used to detect a refill event. Further, an algorithm may be used to detect a false refill event, such as a refill event detected in response to a condition where the vehicle may be disposed on an incline, for example. As such, if a refill event may not be detected and/or if a refill event may be determined false by the algorithm described above, then method 400 may return to step 420 unless a refill event may be detected. However, if a refill event may be detected at step 420, then refill event flowchart 400 may continue to step 430.

At step 430, a flag may be set for a refill event. In particular, an output signal from a level detector, for example, may be sent to the controller indicating a refill event. As such, the controller may set a reductant refill flag. Next, at step 435, a timer may be incremented. In particular, a timer may be incremented until the timer may indicate a time greater than a delay time, as described in step 440.

Continuing to step 440, method 400 may determine if an interval since a reductant refill event has occurred. In some embodiments, the interval may be a length of time (or a number of engine events, number of miles traveled, etc.). In particular, step 440 may determine if a length of time since a reductant refill flag may be set, as described in step 430, may be greater than a time delay. Specifically, a timer, for example, may determine if a length of time greater than a time delay (e.g. a delay time of one minute) may be elapsed subsequent to a reductant refill flagging. As such, if a timer indicates that the interval may be less than or equal to a delay time may be elapsed subsequent to a reductant refill flagging, method 400 may return to step 430. In some embodiments, the interval may be a length of time wherein a urea flow rate and/or ammonia concentration may change by a predetermined amount, for example. In yet other embodiments, the interval may be a change, for example, in NOx concentration. In this way, a reductant refill flag may be set during a range of time initiating when a refill event may be detected and may continue through an interval so as to compensate for residual ammonia in the SCR catalyst before the refill event.

However, if step 440 determines that a length of time greater than a delay time may be elapsed subsequent to a reductant refill flagging, method 400 may continue to step 450. At step 450, a refill flag may be reset. In this way, method 400 may set a refill flag when a refill event may be detected in the reductant storage tank where the flag may remain set until a time delay may be elapsed.

Referring now to monitoring flow chart 410, beginning at step 460, an operating condition may be sensed in the emission control system. In some embodiments, an operating condition may be a conversion efficiency. In addition to or alternately, an operating condition may be a NOx concentration and/or a flow rate from a reductant storage tank, as described above. Further, an operating condition may be sensed during a steady-state operating condition or may be a predetermined operating condition, for example.

Next, at step 470, under some conditions, a deviation from the operating condition sensed at step 460 may be detected. In particular, an operating condition may be sensed where the operating condition may be substantially different from the operating condition sensed at step 460. Specifically, a deviation may be detected where the deviation may indicate a reduction in performance of the emission control system. In some embodiments, a deviation in conversion efficiency may be detected where the deviation may be a drop in the conversion efficiency of the emission control system. For example, a conversion efficiency may drop by a predetermined percentage (e.g. a 40% reduction in conversion efficiency, etc). In other embodiments, a deviation in a NOx concentration leaving the SCR catalyst may be detected where the deviation may be a sudden increase in NOx concentration. Alternately, the controller may indicate a rapid increase in a reductant flow rate through the reductant valve where the increase of flow through the reductant valve may be a deviation. However, under other conditions, a deviation may not be detected at step 470. As such, the monitoring flowchart may return to step 460 wherein an operating condition may be sensed until a deviation may be detected.

Continuing to step 480, if the method detects a deviation at step 470, monitoring flowchart 410 may then determine if a refill flag may be set recently. As described above, a refill flag may be set at step 430 in refill event flowchart 400. Under some conditions, the monitoring flowchart may not detect a refill flag. In some embodiments, a refill event may not be detected at step 420. For example, an amount of reductant may not be introduced to the reductant storage device. In another example, a period of time (i.e. a delay time, etc.) may be elapsed since the refill flag may be set. As such, a refill flag may be reset such that a refill flag may not be detected at step 480, for example. Consequently, if a deviation in an operating condition may be detected, however, a refill flag may not be set, the monitoring flowchart may end. In particular, the monitoring flow chart may not determine a change in reductant quality.

It may be understood that, while the method may not determine a change in reductant quality if a refill flag may not be set, the controller may engage various other methods to address a condition of degraded performance of the emission control system. For example, the controller may prompt various other methods to diagnose degraded performance so as to determine root cause, such as determining performance of the injection system, the SCR catalyst, etc.

Referring back to step 480, if a refill flag may be detected, the method may determine a change in reductant quality. As such, it may be desirable to perform various subsequent steps to address the reduced reductant quality. In some embodiments, the controller may send a signal so as to indicate a degraded quality reductant as described above. Alternately or in addition, the controller may enable various other emission control strategies until an acceptable reductant quality may be detected. For example, the controller may control engine operation so as to abate NOx via various other mechanisms, such as exhaust gas recirculation, engine timing, derating, etc.

It may be appreciated that the order of processing to be detailed is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into a computer readable storage medium for the sensor, for example, in the engine control system.

The invention claimed is:

1. A method of operating a system having an engine and engine fuel system, and a separate reductant delivery and storage system for an SCR catalyst, comprising:
   correlating a change in a monitored operating condition with a reductant storage refill event to determine a dilution of ammonia concentration from addition of a reductant-diluting substance to the reductant storage system, the correlation based on whether the change occurred within a time range from the refill event; and
   performing default action based on the correlation, said refill event identified based on factors comprising at least one of an angle of inclination of the reductant storage system or a road condition.

2. The method of claim 1, wherein said monitored operating condition is at least a NOx amount.

3. The method of claim 1, wherein said monitored operating condition is at least a reductant flow rate.

4. The method of claim 1, wherein said time range is a length of time to deplete and refill the SCR catalyst.

5. A method of operating an engine having a reductant delivery and storage system in an emission control system, comprising:
   correlating a change in a monitored operating condition with a refill event to determine whether a reductant-diluting substance has been added to the reductant storage system, said refill event identified based on factors comprising at least an ambient temperature condition and a reductant storage system inclination angle; and
   limiting vehicle operation based on the correlation.

6. The method of claim 5, wherein said monitored operating condition is at least a NOx amount.

7. The method of claim 5, wherein said monitored operating condition is at least a reductant flow rate.

8. The method of claim 5, wherein the correlation is based on whether the change occurred within a time range from the refill event.

9. The method of claim 8, wherein said time range is a length of time to deplete and refill an SCR catalyst in an exhaust.

10. In a vehicle comprising an internal combustion engine and an emission control system comprising an SCR catalyst, a reductant storage device separate from a fuel storage device, and a reductant delivery system, a method for monitoring reductant quality in the emission control system, the method comprising:
    sensing an operating condition of the emission control system;
    detecting a deviation from said operating condition;
    determining whether the deviation occurred after a refill event of the reductant storage device separate from the fuel storage device, said refill event identified based on factors comprising at least one of an angle of inclination of the reductant storage device or a road condition; and
    if the deviation occurred after the refill event, then determining that a change in reductant quality due to reductant dilution has occurred within a time by addition of a reductant-diluting substance to the reductant storage device separate from the fuel storage device, the reductant reducing NOx in the SCR catalyst.

11. The method of claim 10, wherein said operating condition is at least a concentration of nitrous oxide and said deviation is an increase in said concentration of nitrous oxide, said time being a length of time to deplete and refill the SCR catalyst.

12. The method of claim 10, wherein said operating condition is at least a reductant flow rate and said deviation is a reduction in said reductant flow rate.

13. The method of claim 10, wherein determining whether the deviation occurred after a refill event of the reductant storage device comprises detecting if a refill flag is set when the deviation occurred.

14. The method of claim 13, wherein said time is a length of time to deplete and refill the SCR catalyst.

* * * * *